(12) United States Patent
Guzy et al.

(10) Patent No.: US 12,717,733 B2
(45) Date of Patent: Aug. 25, 2026

(54) SYSTEMS AND METHODS FOR LOAD BALANCING MEMORY TRAFFIC

(71) Applicant: Intel Corporation, Santa Clara, CA (US)

(72) Inventors: Przemek Guzy, Oakville (CA); Sheran Cardoza, Scarborough (CA); Shan Liu, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 18/215,732

(22) Filed: Jun. 28, 2023

(65) Prior Publication Data

US 2023/0342313 A1 Oct. 26, 2023

Related U.S. Application Data

(60) Provisional application No. 63/403,426, filed on Sep. 2, 2022.

(51) Int. Cl.
*G06F 13/16* (2006.01)

(52) U.S. Cl.
CPC ...... *G06F 13/1678* (2013.01); *G06F 13/1631* (2013.01)

(58) Field of Classification Search
CPC ......................... G06F 13/1678; G06F 13/1631
USPC ........................................................ 711/154
See application file for complete search history.

(56) References Cited

U.S. PATENT DOCUMENTS

| | | | | |
|---|---|---|---|---|
| 9,753,854 | B1 | 9/2017 | Bao | |
| 10,613,977 | B1 * | 4/2020 | Diamant | G06F 12/0207 |
| 10,915,471 | B2 | 2/2021 | ChoFleming et al. | |
| 12,204,794 | B1 * | 1/2025 | Ziai | G06F 3/0673 |
| 2011/0004709 | A1 * | 1/2011 | Gower | G06F 13/1684 711/E12.078 |
| 2019/0227716 | A1 * | 7/2019 | Teh | G06F 3/0611 |
| 2022/0197819 | A1 * | 6/2022 | Kumar | G06F 12/109 |

* cited by examiner

*Primary Examiner* — Jared I Rutz
*Assistant Examiner* — Wei Ma
(74) *Attorney, Agent, or Firm* — InventIQ Legal LLP; Steven J. Cahill

(57) ABSTRACT

An integrated circuit includes first and second memory controller circuits and a load balancing multiplexer circuit that redirects a first read operation from the first memory controller circuit to the second memory controller circuit in response to receiving an indication that the second memory controller circuit has available memory bandwidth. A circuit system includes first and second memory devices, first and second memory controller circuits, and a load balancing multiplexer circuit that sends a write operation to the first memory controller circuit to store data in the first memory device and to the second memory controller circuit to store the data in the second memory device, while performing a number of memory traffic shaping operations.

20 Claims, 3 Drawing Sheets

SYSTEMS AND METHODS FOR LOAD BALANCING MEMORY TRAFFIC

CROSS-REFERENCES TO RELATED APPLICATIONS

This patent application claims the benefit of U.S. provisional patent application No. 63/403,426, filed Sep. 2, 2022, which is incorporated by reference herein in its entirety.

TECHNICAL FIELD

The present disclosure relates to electronic systems and methods, and more particularly, to systems and methods for load balancing memory traffic using electronic circuitry.

BACKGROUND

A memory system often includes a memory controller and a memory circuit. The memory controller manages the flow of data transmitted to and from the memory circuit. The memory controller circuit and the memory circuit can be in the same integrated circuit or in different integrated circuits. The memory controller circuit stores data in the memory circuit during write operations. The memory controller circuit accesses data stored in the memory circuit during read operations. In a source synchronous system, a timing signal is transmitted between the memory controller circuit and the memory circuit along with the data during both read and write operations.

DETAILED DESCRIPTION

Figure 1:
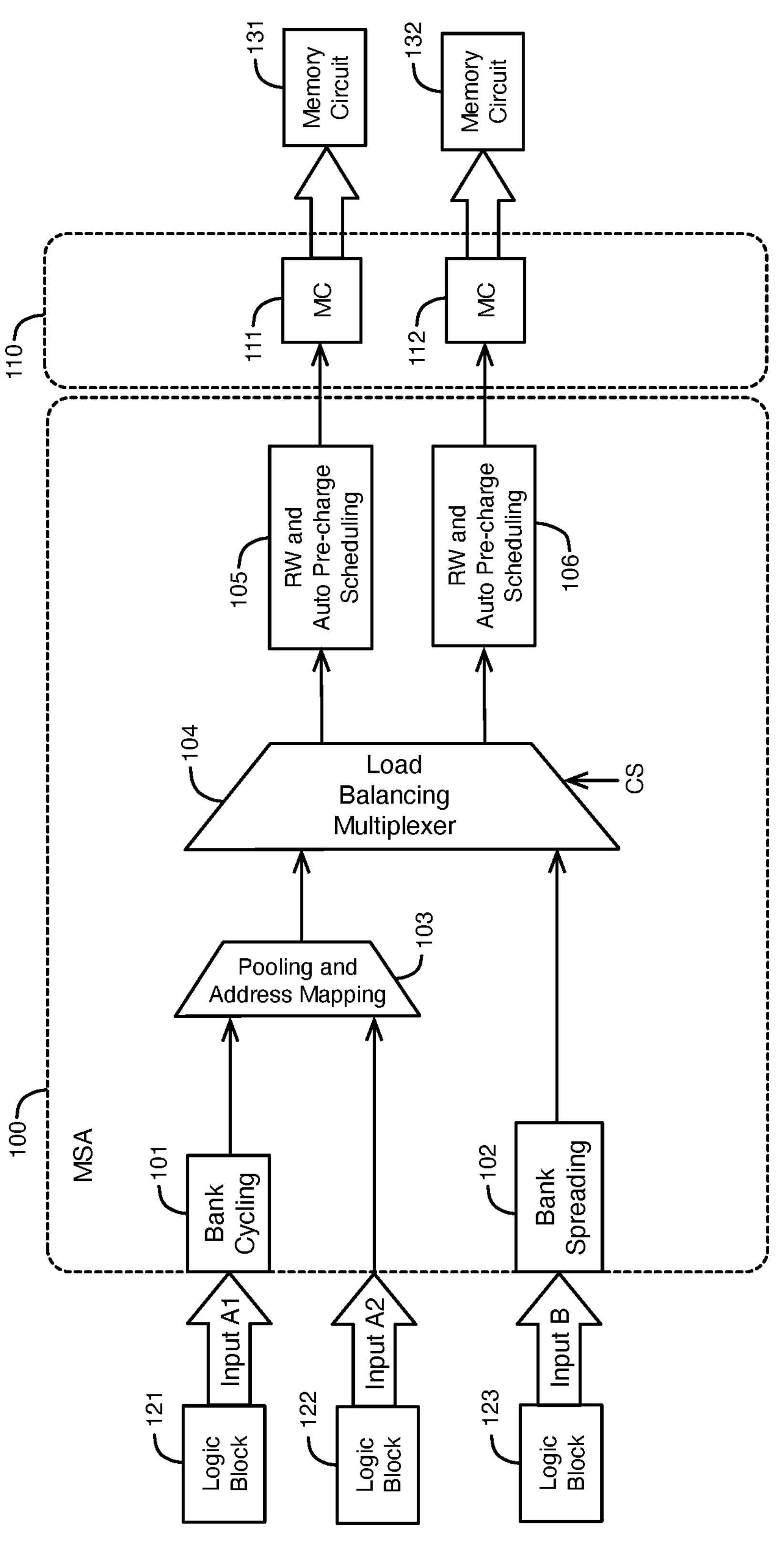
FIG. 1 is a diagram that illustrates an example of a circuit system that can perform load balancing for memory traffic transmitted between logic blocks in an integrated circuit and external memory circuits.

An integrated circuit (IC) can include multiple blocks of logic circuits (also referred to as logic blocks) that can utilize independent external memory interfaces. Under some conditions, each logic block can fully saturate the available bandwidth of its respective memory interface. Consequently, each logic block typically has exclusive access to its respective memory interface. However, in some situations, one of the logic blocks, at some point during operation, may not use the full available bandwidth of its respective memory interface. In these situations, the memory bandwidth that is unused by one of the logic blocks can be utilized by the other logic blocks. As an example, when one logic block has a built-in caching mechanism, there can be a significant amount of time when the memory interface is idle. Furthermore, each logic block may require a different memory specific pre-scheduler of traffic to ensure that memory accesses are issued in the most memory protocol efficient manner possible.

According to some embodiments disclosed herein, a memory system includes logic blocks in an integrated circuit (IC), memory interfaces, memory circuits, and a module that accepts memory transactions to access the memory circuits on multiple input ports. Each of the input ports has a traffic pattern specific optimizer. The module opportunistically routes the memory transactions to an idle memory interface, while ensuring coherency.

Physical memory bandwidth of the memory interfaces can be optimized (e.g., via a configurable pre-scheduler) and also optimally shared between initiators (e.g., the logic blocks). Optimizing and sharing memory bandwidth allows each initiator to have full memory bandwidth available at all times, and up to N-times the memory bandwidth available (where N is the number of physical memory interfaces) when other initiators are idle. Another major benefit is that speeding up and/or optimizing a single user of the memory system provides a speed-up to all other users of the memory system. For example, adding a caching mechanism to one initiator, frees up memory bandwidth to be used by the other initiators. Without this dynamic bandwidth sharing approach, every initiator would need its own cache to receive an increase in speed of memory traffic.

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Throughout the specification, and in the claims, the term "connected" means a direct electrical connection between the circuits that are connected, without any intermediary devices. The term "coupled" means either a direct electrical connection between circuits or an indirect electrical connection through one or more passive or active intermediary devices that allows the transfer of information between circuits. The term "circuit" may mean one or more passive and/or active electrical components that are arranged to cooperate with one another to provide a desired function.

Provisioning an external memory interface to an Advanced Extensible Interface (AXI) at a 1:1 ratio is only efficient when the AXI interfaces demand full bandwidth. Due to internal caching, variable latency, or unique traffic patterns, it is possible that sometimes an internal AXI interface is not using its available memory bandwidth, while another AXI interface would benefit from using the unused memory bandwidth. This problem can be solved by using a load balancing multiplexer that automatically forwards transactions from an internal AXI interface to multiple external memory interfaces.

To successfully redirect traffic from a busy memory interface to an idle memory interface, the memory interfaces must contain the same data at the same addresses. This problem can be solved by transparently duplicating all write operations with a hidden memory address offset to both memory interfaces. For the internal AXI interface, only a single write operation is required, as though there were only a single external memory interface.

A memory specific adapter (MSA) can preschedule, duplicate, and reorder memory transactions to ensure an efficient bus utilization. Some operations can be performed with respect to the incoming data (such as duplication), while other optimizations can be performed with respect to the physical memory interface (e.g., bank scheduling, pre-charge timing, etc.). According to some embodiments disclosed in further detail herein, data-centric optimizations can be performed before the load balancing multiplexer, while optimizations for the memory interface are performed after the load balancing multiplexer.

FIG. 1 is a diagram that illustrates an example of a circuit system that can perform load balancing for memory traffic transmitted between logic blocks in an integrated circuit and external memory circuits. The circuit system of Figure (FIG. 1 includes a memory specific adapter (MSA) circuit 100, a memory interface block 110, logic blocks 121-123, and memory circuits 131-132. The MSA 100 includes a bank cycling circuit 101, a bank spreading circuit 102, a pooling and address mapping circuit 103, a load balancing multiplexer circuit 104, and read-write (RW) auto pre-charge scheduling circuits 105 and 106. The external memory interface block 110 includes memory controller (MC) circuits 111-112. The memory controller circuits 111-112 can be, for example, hard (non-programmable) memory controllers.

The memory specific adapter (MSA) circuit 100 is coupled to transmit memory traffic between multiple logic blocks (e.g., logic blocks 121-123) and multiple memory circuits (e.g., memory circuits 131-132) through the external memory interface block 110. The MSA 100, the logic blocks 121-123, and the external memory interface block 110 can, for example, be located in a single integrated circuit die, and the memory circuits 131-132 can be external to (i.e., located outside of) the integrated circuit die. The integrated circuit (IC) die can be any type of IC, such as a programmable logic IC, a microprocessor IC, a central processing unit IC, a graphics processing unit IC, an application specific IC, etc. If the IC is a programmable logic IC, the logic blocks 121-123 can be implemented by programmable (soft) logic blocks, and the MSA 100 can also be implemented by programmable logic blocks. Memory circuits 131-132 can be, for example, two separate memory integrated circuits (i.e., memory devices) that are external to the IC that includes MSA circuit 100.

The MSA 100 can transparently perform various data-centric optimizations to the memory traffic before the load balancing multiplexer circuit 104. For example, the bank cycling circuit 101 can duplicate write operations received from the logic block 121 (as input A1) so that each write operation is sent to multiple banks within the same memory circuit (e.g., memory circuit 131 or 132). As used herein, the term "bank" refers to a range of memory addresses in a memory circuit, such as the memory circuits 131-132. Bank cycling circuit 101 also duplicates the data for each duplicated write operation. Bank cycling circuit 101 provides the duplicated write operations and the duplicated data to multiplexer circuit 104 via pooling and address mapping (PAM) circuit 103. The multiplexer circuit 104 can provide a hidden memory address offset to the duplicated write operations so that each write operation received from logic block 121 is provided to multiple different banks within one of the memory circuits 131-132, rather than to the same bank. Multiplexer circuit 104 provides the duplicated write operations and the duplicated data to one of the memory controller circuits 111 or 112. The memory controller circuit 111 or 112 sends the duplicated write operations and duplicated data to the respective memory circuit 131 or 132. The duplicated data for the duplicated write operations are written to multiple banks within the same memory circuit 131 or 132.

Bank cycling circuit 101 can also manipulate the addressing on read operations generated by logic block 121, so that each read operation in a set of read operations accessing the same data is sent to a different bank that stored duplicated data during one of the duplicated write operations. Bank cycling circuit 101 sends read operations received from logic block 121 (as input A1) to the multiplexer circuit 104 via PAM circuit 103.

PAM circuit 103 is coupled in MSA circuit 100 to receive read and write operations generated by logic block 121 (via bank cycling circuit 101) and from logic block 122 (as input A2). PAM circuit 103 can pool the read operations generated by logic blocks 121-122 together into one or more groups. PAM circuit 103 can also pool the write operations generated by logic blocks 121-122 into one or more groups. PAM circuit 103 can then send each group of read operations to multiplexer circuit 104 to be forwarded to one of the memory circuits 131-132 as a single group that is not interspersed with write operations. PAM circuit 103 can also send each group of write operations to multiplexer circuit 104 to be forwarded to one of the memory circuits 131-132 as a single group that is not interspersed with read operations. One of the memory circuits can perform the read operations in a group sequentially. One of the memory circuits can perform the write operations in a group sequentially. By sending the read operations and the write operations as groups to the memory circuits, the memory circuits 131-132 can perform the read and write operations more efficiently than switching back and forth between performing a single read operation and a single write operation. PAM circuit 103 can also group write operations from logic blocks 121-122 so that a range of addresses within a single memory circuit are shared by the write operations from logic blocks 121-122.

Bank spreading circuit 102 can also manipulate the addressing on read operations received from logic block 123 (as input B), so that each of the read operations is sent to a different bank in one of the memory circuits 131-132 each time, without duplicating write operations. Bank spreading circuit 102 does not cause data for write operations generated by logic block 123 to be stored in multiple banks. Instead, bank spreading circuit 102 rearranges the order of the read operations received from the logic block 123 to cause the next read operation to be provided to a different bank in one of the memory circuits (via multiplexer circuit 104) than the immediately preceding read operation from logic block 123. Bank spreading circuit 102 can, for example, cause each read operation in a set of read operations (e.g., having any number of read operations) that is provided to one of the memory circuits through multiplexer circuit 104 to access a different bank in that memory circuit.

The load balancing multiplexer circuit 104 of FIG. 1 functions as a general purpose switch to automatically manipulate memory traffic between the logic blocks 121-123 and the memory controller circuits 111-112. A user of the circuit system of FIG. 1 can enable the load balancing functions of multiplexer circuit 104, without needing to be aware of the inner workings of the MSA 100. The load balancing multiplexer circuit 104 can be implemented in any type of IC, such as a field programmable gate array (FPGA), a microprocessor, or an application specific integrated circuit (ASIC).

The load balancing multiplexer circuit 104 can redirect memory traffic from a busy one of the memory controller circuits in block 110 to an idle one of the memory controller circuits in block 110 by using the same data in the memory traffic at the same addresses in order to more efficiently utilize the available memory bandwidth. To implement memory traffic optimization between the memory controller circuits, multiplexer circuit 104 sends each write operation received from any one of the logic blocks 121-123 and the data to be written for each write operation to each of the memory controller circuits 111-112. Thus, multiplexer circuit 104 sends a duplicate copy of each write operation and a duplicate copy of the data to be written for each write operation to each memory controller circuit 111-112. One of the copies of each write operation and one of the copies the data to be written for each write operation is sent through each of the memory controller circuits 111-112 to each of the memory circuits 131-132, so that the data for each write operation are written to each of the memory circuits 131-132. Multiplexer circuit 104 can provide a hidden memory address offset to duplicated write operations so that each write operation and its associated data is provided to both of the memory circuits 131-132 through both of the memory controller circuits 111-112, without causing a memory address collision.

Logic blocks 121-123 can issue read operations that are intended to access data that has been duplicated and stored in both of the memory circuits 131-132 during write operations. If the data to be accessed in a read operation generated by one of logic blocks 121-123 was duplicated and stored in both memory circuits 131-132, multiplexer circuit 104 can cause the read operation to access the data from either one of the memory circuits 131-132. Thus, as an example, multiplexer circuit 104 can send one read operation received from one of logic blocks 121-123 through memory controller circuit 111 to access data from memory circuit 131 and another read operation received from one of logic blocks 121-123 through memory controller circuit 112 to access data from memory circuit 132.

In order to more efficiently utilize the available memory bandwidth of memory interface block 110, multiplexer circuit 104 can send read operations received from any of logic blocks 121-123 to either of the memory controller circuits 111 or 112, which then send the read operations to the respective memory circuits 131 or 132, based on the available memory bandwidth of the memory controller circuits 111-112. The multiplexer circuit 104 can redirect one or more read operations from one of the memory controller circuits 111 or 112 to the other memory controller circuit 111 or 112 in response to receiving an indication that the other memory controller circuit has available memory bandwidth. The indication can, for example, be in the form of one or more control signals CS that indicate the activity of one or more of the logic blocks 121-123. The control signals CS are provided to multiplexer circuit 104.

For example, if logic block 123 is idle (i.e., not issuing read or write operations through memory controller circuit 112), then multiplexer circuit 104 can direct read operations issued by one or both of logic blocks 121-122 through both of the memory controller circuits 111-112 to both of the memory circuits 131-132. As another example, if logic blocks 121-122 are idle (i.e., not issuing read or write operations through memory controller circuit 111), then multiplexer circuit 104 can direct read operations issued by logic block 123 through both of the memory controller circuits 111-112 to both of the memory circuits 131-132. The memory traffic optimizations performed by multiplexer circuit 104 do not need to be specific to any particular memory protocol. These optimizations can be performed if the data to be accessed in each read operation is stored in both memory circuits 131-132.

The circuit system of FIG. 1 can be used for an application having, for example, multiple networking lookup intellectual property (IP) blocks (e.g., multi-bin lookup (MBL) and flow tracker (FT)) implemented by the logic blocks 121-123. Each of the logic blocks 121-123 can have multiple ports into the memory specific adapter (MSA) 100, have different traffic optimizations patterns, and can share the bandwidth of multiple memory controller circuits in memory interface block 110, as described above. As an example, in the application of FIG. 1, logic block 121 can implement flow tracker (FT) with internal caching and may underutilize its memory interface in block 110. When the logic block 121 implementing FT is underutilizing its memory interface, the multiplexer circuit 104 can automatically spread write and read operations from logic block 123 implementing MBL across both memory controller circuits 111-112 to both memory circuits 131-132.

The MSA 100 can also transparently perform memory interface optimizations to the memory traffic output by the multiplexer circuit 104 using RW and auto pre-charge scheduling circuits 105 and 106. RW and auto pre-charge scheduling circuits 105 and 106 can perform memory interface optimizations on the memory traffic (e.g., read and write operations) sent from multiplexer circuit 104 to the memory controller circuits 111-112, respectively. RW and auto pre-charge scheduling circuits 105 and 106 can, for example, issue pre-charge commands to memory circuits 131-132 via memory controller circuits 111-112, respectively, in response to receiving a group of read or write operations to pre-charge the banks to be accessed in these operations in order to reduce memory access times. As another example, the RW and auto pre-charge scheduling circuits 105 and 106 can schedule the issuance of read and/or write operations to banks in the memory circuits 131-132 via memory controller circuits 111-112, respectively, to optimize the memory accesses based on the memory addresses accessed by these read and/or write operations.

In other embodiments, the load balancing multiplexer circuit 104 can be used in any M×N topology, wherein memory traffic from M initiators can be spread across N memory interfaces. Thus, the load balancing multiplexer circuit 104 can perform memory traffic optimizations on read and write operations, as described herein, that are received from any number M of logic blocks (e.g., in the same IC). The load balancing multiplexer circuit 104 can send duplicated write operations from the M logic blocks to any number N of memory circuits through an N number of memory controller circuits. The load balancing multiplexer circuit 104 can direct read operations from the M logic blocks to any of the N memory circuits through the N number of memory controller circuits. Accesses to different memory interfaces can be placed in separate queues (e.g., first-in-first-out buffers) and issued such that traffic is evenly distributed across the memory interfaces.

Figure 2:
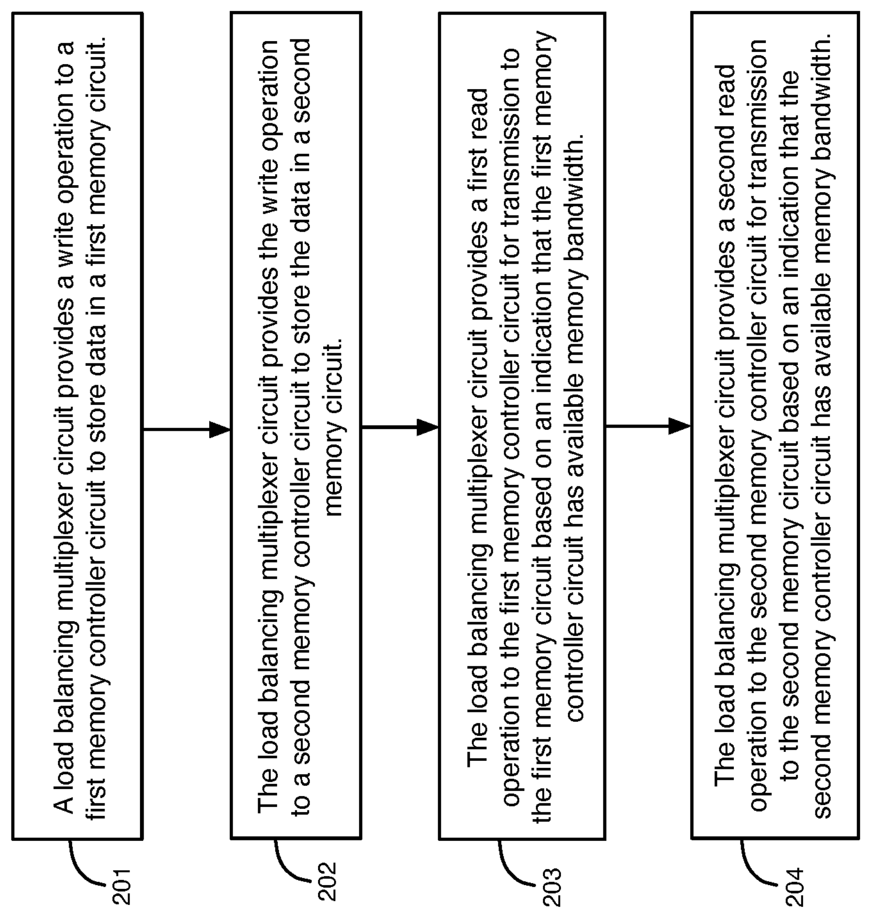
FIG. 2 is a diagram of a flow chart that illustrates examples of operations that can be performed to access first and second memory circuits.

FIG. 2 is a diagram of a flow chart that illustrates examples of operations that can be performed to access first and second memory circuits. In operation 201, a load balancing multiplexer circuit (e.g., load balancing multiplexer circuit 104) provides a write operation to a first memory controller circuit (e.g., memory controller circuit 111) to store data in a first memory circuit (e.g., memory circuit 131). In operation 202, the load balancing multiplexer circuit provides the write operation to a second memory controller circuit (e.g., memory controller circuit 112) to store the data in a second memory circuit (e.g., memory circuit 132). In operation 203, the load balancing multiplexer circuit provides a first read operation to the first memory controller circuit for transmission to the first memory circuit based on an indication that the first memory controller circuit has available memory bandwidth. In operation 204, the load balancing multiplexer circuit provides a second read operation to the second memory controller circuit for transmission to the second memory circuit based on an indication that the second memory controller circuit has available memory bandwidth. The first or the second memory circuit may access the data stored during the write operation in response to the first or the second read operation, respectively.

Figure 3:
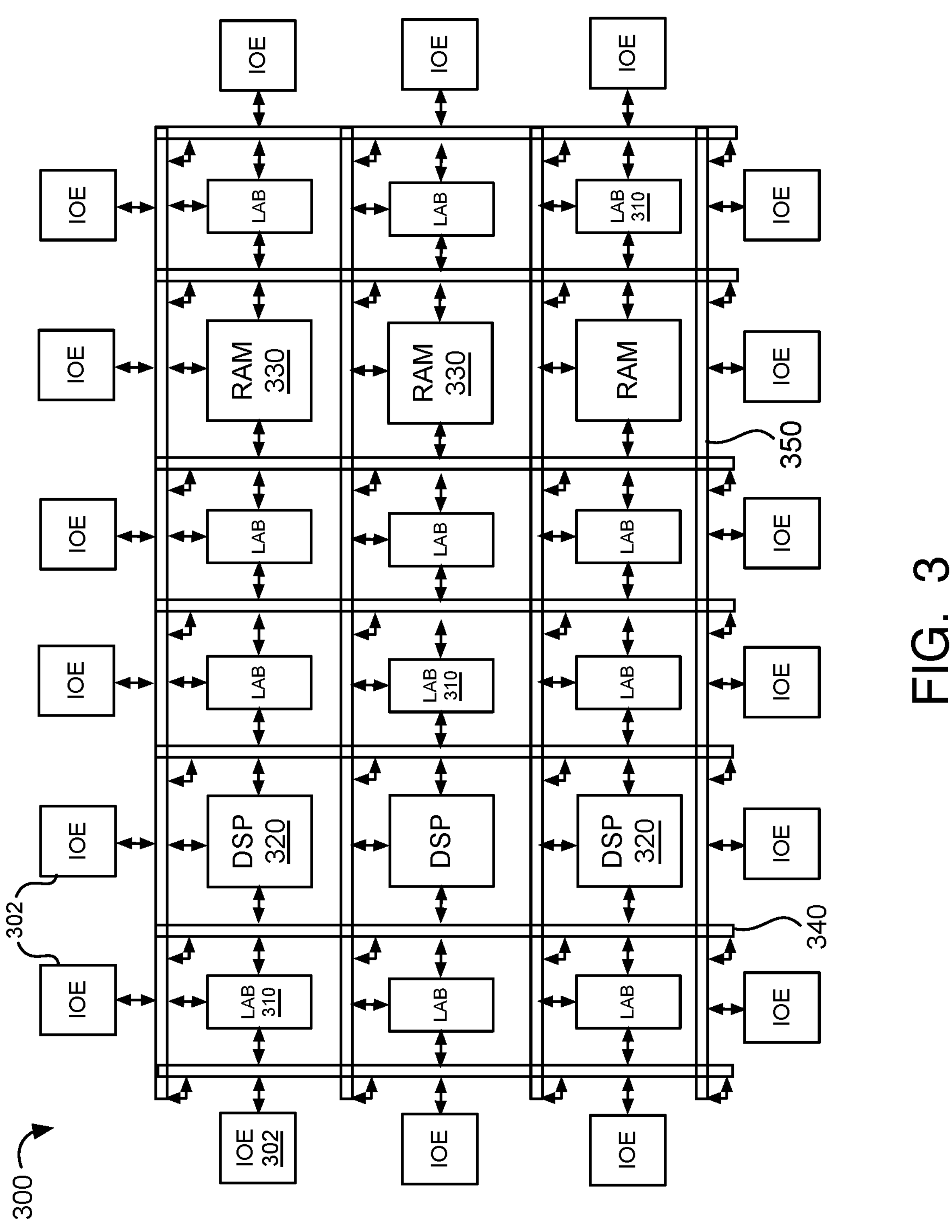
FIG. 3 illustrates an example of a programmable logic integrated circuit that can implement techniques disclosed herein.

Figure (FIG. 3 illustrates an example of a programmable logic IC 300 that can implement techniques disclosed herein. Programmable logic IC 300 can, for example, include the memory specific adapter (MSA) circuit 100, the memory interface block 110, and logic blocks 121-123 of FIG. 1. As shown in FIG. 3, the programmable logic IC 300 includes a two-dimensional array of configurable functional circuit blocks, including configurable logic array blocks (LABs) 310 and other functional circuit blocks, such as random access memory (RAM) blocks 330 and digital signal processing (DSP) blocks 320. Functional blocks such as LABs 310 can include smaller programmable logic circuits (e.g., logic elements, logic blocks, or adaptive logic modules) that receive input signals and perform custom functions on the input signals to produce output signals. The logic blocks 121-123 of FIG. 1 can be, for example, configurable functional circuit blocks, such as LABs 310, DSP blocks 320, or RAM blocks 330.

In addition, programmable logic IC 300 can have input/output elements (IOEs) 302 for driving signals off of programmable logic IC 300 and for receiving signals from other devices. IOEs 302 may include parallel input/output circuitry, serial data transceiver circuitry, differential receiver and transmitter circuitry, or other circuitry used to connect one integrated circuit to another integrated circuit. As shown, IOEs 302 may be located around the periphery of the chip. If desired, the programmable logic IC 300 may have IOEs 302 arranged in different ways. For example, IOEs 302 may form one or more columns, rows, or islands of input/output elements that may be located anywhere on the programmable IC 300.

The programmable logic IC 300 can also include programmable interconnect circuitry in the form of vertical routing channels 340 (i.e., interconnects formed along a vertical axis of programmable logic IC 300) and horizontal routing channels 350 (i.e., interconnects formed along a horizontal axis of programmable logic IC 300), each routing channel including at least one track to route at least one wire.

Note that other routing topologies, besides the topology of the interconnect circuitry depicted in FIG. 3, may be used. For example, the routing topology may include wires that travel diagonally or that travel horizontally and vertically along different parts of their extent as well as wires that are perpendicular to the device plane in the case of three dimensional integrated circuits. The driver of a wire may be located at a different point than one end of a wire.

Furthermore, it should be understood that embodiments disclosed herein with respect to FIGS. 1-2 may be implemented in any integrated circuit or electronic system. If desired, the functional blocks of such an integrated circuit may be arranged in more levels or layers in which multiple functional blocks are interconnected to form still larger blocks. Other device arrangements may use functional blocks that are not arranged in rows and columns.

Programmable logic IC 300 may contain programmable memory elements. Memory elements may be loaded with configuration data using IOEs 302. Once loaded, the memory elements each provide a corresponding static control signal that controls the operation of an associated configurable functional block (e.g., LABs 310, DSP blocks 320, RAM blocks 330, or IOEs 302).

In a typical scenario, the outputs of the loaded memory elements are applied to the gates of metal-oxide-semiconductor field-effect transistors (MOSFETs) in a functional block to turn certain transistors on or off and thereby configure the logic in the functional block including the routing paths. Programmable logic circuit elements that can be controlled in this way include parts of multiplexers (e.g., multiplexers used for forming routing paths in interconnect circuits), look-up tables, logic arrays, AND, OR, NAND, and NOR logic gates, pass gates, etc.

The programmable memory elements can be organized in a configuration memory array consisting of rows and columns. A data register that spans across all columns and an address register that spans across all rows may receive configuration data. The configuration data may be shifted onto the data register. When the appropriate address register is asserted, the data register writes the configuration data to the configuration memory bits of the row that was designated by the address register.

In certain embodiments, programmable logic IC 300 may include configuration memory that is organized in sectors, whereby a sector may include the configuration RAM bits that specify the functions and/or interconnections of the subcomponents and wires in or crossing that sector. Each sector may include separate data and address registers.

The programmable IC of FIG. 3 is merely one example of an IC that can include embodiments disclosed herein. The embodiments disclosed herein may be incorporated into any suitable integrated circuit or system. For example, the embodiments disclosed herein may be incorporated into numerous types of devices such as processor integrated circuits, central processing units, memory integrated circuits, graphics processing unit integrated circuits, application specific standard products (ASSPs), application specific integrated circuits (ASICs), and programmable logic integrated circuits. Examples of programmable logic integrated circuits include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The integrated circuits disclosed in one or more embodiments herein may be part of a data processing system that includes one or more of the following components: a processor; memory; input/output circuitry; and peripheral devices. The data processing system can be used in a wide variety of applications, such as computer networking, data networking, instrumentation, video processing, digital signal processing, or any suitable other application. The integrated circuits can be used to perform a variety of different logic functions.

In general, software and data for performing any of the functions disclosed herein can be stored in non-transitory computer readable storage media. Non-transitory computer readable storage media is tangible computer readable storage media that stores data and software for access at a later time, as opposed to media that only transmits propagating electrical signals (e.g., wires). The software code may sometimes be referred to as software, data, program instructions, instructions, or code. The non-transitory computer readable storage media can, for example, include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are now described. Example 1 is an integrated circuit comprising: first and second memory controller circuits; and a load balancing multiplexer circuit that redirects a first read operation from the first memory controller circuit to the second memory controller circuit in response to receiving a first indication that the second memory controller circuit comprises first available memory bandwidth.

In Example 2, the integrated circuit of Example 1 can further comprise: a logic block that issues the first read operation and a second read operation, wherein the load balancing multiplexer circuit sends the second read operation to the first memory controller circuit in response to receiving a second indication that the first memory controller circuit comprises second available memory bandwidth.

In Example 3, the integrated circuit of Example 1 can further comprise: a first logic block that issues the first read operation; and a second logic block that issues a second read operation, wherein the load balancing multiplexer circuit sends the second read operation to the first memory controller circuit in response to receiving a second indication that the first memory controller circuit comprises second available memory bandwidth.

In Example 4, the integrated circuit of any one of Examples 2-3 can optionally include, wherein the first memory controller circuit transmits the second read operation to a first external memory circuit, and wherein the second memory controller circuit transmits the first read operation to a second external memory circuit.

In Example 5, the integrated circuit of any one of Examples 1-4 can optionally include, wherein the load balancing multiplexer circuit sends a write operation to the first memory controller circuit to store data in a first external memory circuit and to the second memory controller circuit to store the data in a second external memory circuit.

In Example 6, the integrated circuit of any one of Examples 4-5 can optionally include, wherein the first memory controller circuit is coupled to the first external memory circuit, and wherein the second memory controller circuit is coupled to the second external memory circuit.

In Example 7, the integrated circuit of any one of Examples 1-6 can further comprise: a bank cycling circuit that duplicates a write operation to generate duplicate write operations, wherein the load balancing multiplexer circuit sends each of the duplicate write operations to a different bank of addresses within a memory device.

In Example 8, the integrated circuit of any one of Examples 1-7 can further comprise: a bank spreading circuit that causes each request in a set of read requests to be sent to a different bank of address within a memory device.

In Example 9, the integrated circuit of any one of Examples 1-8 can further comprise: a pooling circuit that causes a set of read requests to be provided to a memory device as a first group and a set of write requests to be provided to the memory device as a second group.

Example 10 is a method for accessing first and second memory circuits, the method comprising: providing a first read operation through a load balancing multiplexer circuit to a first memory controller circuit for transmission to the first memory circuit; and providing a second read operation through the load balancing multiplexer circuit to a second memory controller circuit for transmission to the second memory circuit based on a first indication that the second memory controller circuit comprises first available memory bandwidth.

In Example 11, the method of Example 10 can optionally include, wherein the load balancing multiplexer circuit provides the first read operation to the first memory controller circuit based on a second indication that the first memory controller circuit comprises second available memory bandwidth.

In Example 12, the method of any one of Examples 10-11 can further comprise: providing a write operation through the load balancing multiplexer circuit to the first memory controller circuit to store data in the first memory circuit; and providing the write operation through the load balancing multiplexer circuit to the second memory controller circuit to store the data in the second memory circuit, wherein the second read operation accesses the data in the second memory circuit.

In Example 13, the method of any one of Examples 10-12 can further comprise: performing memory interface optimizations for the first and the second read operations received from the load balancing multiplexer circuit; and providing the memory interface optimizations to the first and the second memory controller circuits.

In Example 14, the method of any one of Examples 10-13 can further comprise: duplicating a write operation to generate duplicate write operations using a bank cycling circuit; and sending each of the duplicate write operations to a different bank of addresses within the first memory circuit or the second memory circuit through the load balancing multiplexer circuit.

In Example 15, the method of any one of Examples 10-14 can further comprise: sending each read request in a set of read requests to a different bank of address within the first memory circuit or the second memory circuit using a bank spreading circuit.

Example 16 is a circuit system comprising: first and second memory devices; first and second memory controller circuits; and a load balancing multiplexer circuit that sends a first write operation to the first memory controller circuit to store first data in the first memory device, wherein the load balancing multiplexer circuit sends the first write operation to the second memory controller circuit to store the first data in the second memory device.

In Example 17, the circuit system of Example 16 can optionally include, wherein the first and the second memory controller circuits and the load balancing multiplexer circuit are in a first integrated circuit, wherein the first memory device is a second integrated circuit, and wherein the second memory device is a third integrated circuit.

In Example 18, the circuit system of any one of Examples 16-17 can optionally include, wherein the load balancing multiplexer circuit provides a read operation to the second memory controller circuit for transmission to the second memory device based on an indication that the second memory controller circuit has available memory bandwidth.

In Example 19, the circuit system of any one of Examples 16-18 can optionally include, wherein the load balancing multiplexer circuit sends a second write operation to the first memory controller circuit to store second data in the first memory device, and wherein the load balancing multiplexer circuit sends the second write operation to the second memory controller circuit to store the second data in the second memory device.

In Example 20, the circuit system of any one of Examples 16-19 can optionally include, wherein the load balancing multiplexer circuit provides a read operation to one of the first or the second memory controller circuits to access the first data from a respective one of the first or the second memory devices based on available memory bandwidth of the one of the first or the second memory controller circuits.

The foregoing description of the exemplary embodiments has been presented for the purpose of illustration. The foregoing description is not intended to be exhaustive or to be limiting to the examples disclosed herein. The foregoing is merely illustrative of the principles of this disclosure and various modifications can be made by those skilled in the art. The foregoing embodiments may be implemented individually or in any combination.

The invention claimed is:

1. An integrated circuit comprising:

a first logic block that issues first read operations;

a second logic block;

first and second memory controller circuits; and a load balancing multiplexer circuit that redirects a first one of the first read operations issued by the first logic block from the first memory controller circuit to the second memory controller circuit in response to receiving a first indication indicating that the second memory controller circuit comprises first available memory bandwidth and that the second logic block is idle and not issuing second read operations through the second memory controller circuit, wherein the first memory controller circuit is configured to transmit a second one of the first read operations to a first memory circuit that is external to the integrated circuit, and wherein the second memory controller circuit is configured to transmit the first one of the first read operations to a second memory circuit that is external to the integrated circuit.

2. The integrated circuit of claim 1, wherein the load balancing multiplexer circuit sends the second one of the first read operations to the first memory controller circuit in response to receiving a second indication indicating that the first memory controller circuit comprises second available memory bandwidth.

3. The integrated circuit of claim 1 further comprising:

a third logic block that issues third read operations, wherein the load balancing multiplexer circuit sends the third read operations to the first memory controller circuit in response to receiving a second indication indicating that the first memory controller circuit comprises second available memory bandwidth, and wherein the second indication further indicates that the first logic block is idle.

4. The integrated circuit of claim 1, wherein the integrated circuit is a programmable logic integrated circuit.

5. The integrated circuit of claim 1, wherein the load balancing multiplexer circuit sends a write operation to the first memory controller circuit to store data in the first memory circuit and to the second memory controller circuit to store the data in the second memory circuit.

6. The integrated circuit of claim 5, wherein the first memory controller circuit is coupled to the first memory circuit, and wherein the second memory controller circuit is coupled to the second memory circuit.

7. The integrated circuit of claim 1 further comprising:

a bank cycling circuit that duplicates a write operation to generate duplicate write operations, wherein the load balancing multiplexer circuit sends each of the duplicate write operations to a different bank of addresses within a memory device.

8. The integrated circuit of claim 1 further comprising:

a bank spreading circuit that causes the first one of the first read operations to be provided to a different bank in the second memory circuit via the load balancing multiplexer circuit than a third one of the first read operations immediately preceding the first one of the first read operations.

9. The integrated circuit of claim 1 further comprising:

a pooling circuit that causes a set of read requests to be provided to a memory device as a first group and a set of write requests to be provided to the memory device as a second group.

10. A method for accessing first and second memory circuits, the method comprising:

providing a first read operation issued by a first logic block through a load balancing multiplexer circuit to a first memory controller circuit for transmission to the first memory circuit; and providing a second read operation issued by the first logic block through the load balancing multiplexer circuit to a second memory controller circuit for transmission to the second memory circuit based on a first indication that the second memory controller circuit comprises first available memory bandwidth and that a second logic block is idle and not issuing third read operations through the second memory controller circuit, wherein the first and the second logic blocks and the first and the second memory controller circuits are in an integrated circuit, and wherein the first and the second memory circuits are external to the integrated circuit.

11. The method of claim 10, wherein the integrated circuit is a programmable logic integrated circuit.

12. The method of claim 10 further comprising:

providing a write operation through the load balancing multiplexer circuit to the first memory controller circuit to store data in the first memory circuit; and providing the write operation through the load balancing multiplexer circuit to the second memory controller circuit to store the data in the second memory circuit, wherein the second read operation accesses the data in the second memory circuit.

13. The method of claim 10 further comprising:

performing memory interface optimizations for the first and the second read operations received from the load balancing multiplexer circuit; and providing the memory interface optimizations to the first and the second memory controller circuits.

14. The method of claim 10 further comprising:

duplicating a write operation to generate duplicate write operations using a bank cycling circuit; and sending each of the duplicate write operations to a different bank of addresses within the first memory circuit through the load balancing multiplexer circuit.

15. The method of claim 10 further comprising:

causing a set of write requests to be provided to the first memory circuit as a group using a pooling circuit.

16. A circuit system comprising:

first and second memory devices;

first and second memory controller circuits;

first and second logic blocks; and a load balancing multiplexer circuit that provides a first read operation issued by the first logic block to the second memory controller circuit for transmission to the second memory device based on a first indication that the second logic block is idle and not issuing second read operations through the second memory controller circuit, wherein the first indication further indicates that the second memory controller circuit has first available memory bandwidth, wherein the first memory controller circuit transmits a third read operation issued by the first logic block to the first memory device, wherein the second memory controller circuit transmits the first read operation to the second memory device, and wherein the first and the second logic blocks, the first and the second memory controller circuits, and the load balancing multiplexer circuit are in an integrated circuit.

17. The circuit system of claim 16, wherein the integrated circuit is a programmable logic integrated circuit.

18. The circuit system of claim 16, wherein the load balancing multiplexer circuit provides the third read operation to the first memory controller circuit for transmission to the first memory device based on a second indication that the first memory controller circuit has second available memory bandwidth.

19. The circuit system of claim 16, wherein the load balancing multiplexer circuit sends a first copy of a write operation to the first memory controller circuit to store a first copy of data in the first memory device, and wherein the load balancing multiplexer circuit sends a duplicate copy of the write operation to the second memory controller circuit to store a duplicate copy of the data in the second memory device.

20. The circuit system of claim 16, wherein the load balancing multiplexer circuit provides a fourth read operation to the first memory controller circuit in response to receiving a second indication indicating that the first logic block is idle and that the first memory controller circuit comprises second available memory bandwidth.

* * * * *